US010118548B1

(12) United States Patent
Fields et al.

(10) Patent No.: US 10,118,548 B1
(45) Date of Patent: Nov. 6, 2018

(54) AUTONOMOUS VEHICLE SIGNALING OF THIRD-PARTY DETECTION

(71) Applicant: STATE FARM MUTUAL AUTOMOBILE INSURANCE COMPANY, Bloomington, IL (US)

(72) Inventors: Brian Mark Fields, Normal, IL (US); Duane Christiansen, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 15/624,363

(22) Filed: Jun. 15, 2017

(51) Int. Cl.
*G05D 1/02* (2006.01)
*B60Q 5/00* (2006.01)
*B60Q 1/26* (2006.01)
*G05D 1/00* (2006.01)

(52) U.S. Cl.
CPC .............. *B60Q 5/005* (2013.01); *B60Q 1/26* (2013.01); *G05D 1/0088* (2013.01)

(58) Field of Classification Search
None
See application file for complete search history.

(56) References Cited

U.S. PATENT DOCUMENTS

| 7,019,669 | B1 * | 3/2006 | Carr .............................. 340/906 |
| 8,537,030 | B2 * | 9/2013 | Perkins ......................... 340/904 |
| 8,547,249 | B2 * | 10/2013 | David et al. .................. 340/903 |
| 9,168,867 | B2 * | 10/2015 | Tamatsu ................. B60Q 5/005 |
| 9,365,218 | B2 | 6/2016 | Pallett et al. |
| 2005/0073438 | A1 * | 4/2005 | Rodgers ................. G08G 1/161 340/944 |
| 2015/0179063 | A1 * | 6/2015 | Aziz ...................... G08G 1/005 340/944 |
| 2017/0060130 | A1 * | 3/2017 | Kim ..................... G05D 1/0055 |

OTHER PUBLICATIONS

Gorzelany, "'The Smiling Car' Concept Gives Autonomous Autos a Great Big Emoji", Forbes Media LLC, 2016, https://www.forbes.com/sites/jimgorzelany/2016/09/16/the-smiling-car-concept-gives-autonomous-autos-a-great-big-emoji/#3451f957243d, 2 pages.

* cited by examiner

*Primary Examiner* — Brent Swarthout
(74) *Attorney, Agent, or Firm* — Marshall, Gerstein & Borun LLP; Randall G. Rueth

(57) ABSTRACT

Techniques for a fully- or semi-autonomously operated vehicle (AV) to signal to or notify a third-party located within the vehicle's environment that the vehicle has detected the third-party's presence are provided. The third-party may be a pedestrian or a passenger in another proximate vehicle. Sensors associated with the AV may provide data via which the third-party's presence (and optionally, movement and behavior) is detected, and signaling device(s) on-board the vehicle may transmit audio, visual, and/or electromagnetic signals into the environment to indicate that the vehicle is aware of the third-party's presence. In some situations, a two-way dialog between the signaling device(s) and the third-party may be established to confirm intended behaviors or actions of the vehicle and/or of the third-party. Increased safety and decreased risk of accident or injury may be provided with AVs in a manner that is familiar to third-parties' defensive signaling with drivers of non-autonomous vehicles.

20 Claims, 3 Drawing Sheets

AUTONOMOUS VEHICLE SIGNALING OF THIRD-PARTY DETECTION

FIELD OF DISCLOSURE

The present disclosure generally relates to systems, methods, and techniques for autonomous vehicles to signal or indicate, to a third-party within the autonomous vehicle's environment, that the autonomous vehicle has detected the third-party.

BACKGROUND

To decrease the risk of accident or injury during various driving situations, a driver of a non-autonomous vehicle may bodily signal to a third-party who is external to the vehicle, e.g., a pedestrian or cyclist, to assure the third-party that the driver is aware of the third-party's presence. For example, as a driver approaches a crosswalk that a pedestrian is waiting to use, the pedestrian and the driver may make eye contact, thereby affirmatively verifying that the driver is aware of the pedestrian's presence. Subsequently, the driver may signal to the pedestrian that it is safe for the pedestrian to use the crosswalk, e.g., by a nod of the driver's head or a wave of the driver's hand. In another example, when multiple drivers approach a four-way stop, the drivers may make eye contact and bodily provide signals with each other (e.g., head nod, hand wave, or other) to determine and acknowledge which driver is to proceed into the intersection. As such, human beings are able to perform defensive signaling with one another to ensure safety and decrease the risk of accident or injury. For example, a human driver is able to bodily signal or communicate to a third-party to indicate that the third-party has been detected by the driver, and is able to nonverbally communicate with the third-party to determine, clarify, and confirm subsequent actions to ensure the safety of the third-party and of the driver, as well as to avoid accident or injury.

SUMMARY

The present disclosure generally relates to systems, methods, and techniques for an autonomous vehicle (also interchangeably referred to herein as an "AV") or self-driving vehicle to indicate or signal to a third-party that the presence of the third-party has been detected by the autonomous vehicle. Embodiments of example systems, methods, and techniques are summarized below. The systems, methods, and techniques summarized below may include additional, less, or alternate actions, including those discussed elsewhere herein.

In an embodiment, a system for signaling or indicating, to a third-party who is external to a vehicle, that the third-party has been detected by the vehicle may comprise one or more sensors associated with the vehicle; one or more processors associated with the vehicle and communicatively connected to the one or more sensors; one or more signaling devices associated with the vehicle and communicatively connected to the one or more processors; and one or more tangible, non-transitory memories storing thereon computer-executable instructions. The computer-executable instructions, when executed by the one or more processors, may cause the system to monitor, via the one or more sensors, an environment in which the vehicle is located, the environment in which the vehicle is located being a vehicle environment; and detect that a third-party is located within the vehicle environment based upon sensor data obtained from the one or more sensors while monitoring the vehicle environment. The third-party may include a person or human being, for example. Additionally, the computer-executable instructions, when executed by the one or more processors, may cause the system to generate a notification indicating that a presence of the third-party has been detected by the vehicle (e.g., may cause the system to generate a third-party detection notification); and may cause the system to transmit, into the vehicle environment via the one or more signaling devices associated with the vehicle, an indication of the third-party detection notification, thereby alerting the third-party that the presence of the third-party has been detected by the vehicle.

In an embodiment, a computer-implemented method of signaling or indicating, to a third-party who is external to a vehicle, that the third-party has been detected by the vehicle may include monitoring, using one or more sensors associated with the vehicle, an environment in which the vehicle is located, the environment in which the vehicle is located being a vehicle environment; detecting, based upon sensor data obtained from the one or more sensors while monitoring the vehicle environment and by one or more processors associated with the vehicle and communicatively connected to the one or more sensors, that a third-party is located within the vehicle environment, where the third-party comprises a person; and generating, by the one or more processors, a notification indicating that a presence of the third-party has been detected by the vehicle, the notification being a third-party detection notification. The method may further include transmitting, into the vehicle environment via a signaling device associated with the vehicle, an indication of the third-party detection notification, thereby alerting the third-party that the presence of the third-party has been detected by the vehicle.

In an embodiment, a tangible, non-transitory computer-readable medium may store instructions for signaling, acknowledging, or indicating third-party detection. The stored instructions, when executed by one or more processors of a computer system, may cause the computer system to monitor, via one or more sensors associated with the vehicle, an environment in which the vehicle is located, the environment in which the vehicle is located being a vehicle environment; and detect that a third-party is located within the vehicle environment based upon sensor data obtained from the one or more sensors while monitoring the vehicle environment in which the vehicle is located, where the third-party comprises a person. The stored instructions, when executed by the one or more processors of the computer system, may further cause the computer system to generate a notification indicating that a presence of the third-party has been detected by the vehicle, where the notification is a third-party detection notification. Additionally, the stored instructions, when executed by the one or more processors of the computer system, may further cause the computer system to transmit, into the vehicle environment via one or more signaling devices associated with the vehicle, an indication of the third-party detection notification, thereby alerting the third-party that the presence of the third-party has been detected by the vehicle.

Systems or computer-readable media storing executable instructions for implementing all or part of the systems and/or methods described herein may also be provided in some embodiments. Systems for implementing such methods may include one or more of the following: a special-purpose computing device, a mobile computing device, a personal electronic device, an on-board computer, one or more remote servers or cloud computing system, one or more remote data storage entities, one or more sensors, one or more communication modules configured to communicate wirelessly via radio links, radio frequency links, and/or wireless communication channels, and/or one or more non-transitory, tangible program memories or computer-executable media coupled to one or more processors of the special-purpose computing device, mobile computing device, personal electronic device, on-board computer, and/or one or more remote servers or cloud computing system. Such program memories and computer-executable media may store instructions, which, when executed by the one or more processors, may cause a system described herein to implement part or all of one or more methods described herein. Additional or alternative features described herein below may be included in some embodiments.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, systems, and techniques disclosed herein. It should be understood that each figure depicts an embodiment of a particular aspect of the disclosed applications, methods, systems, and techniques, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Figure 1:
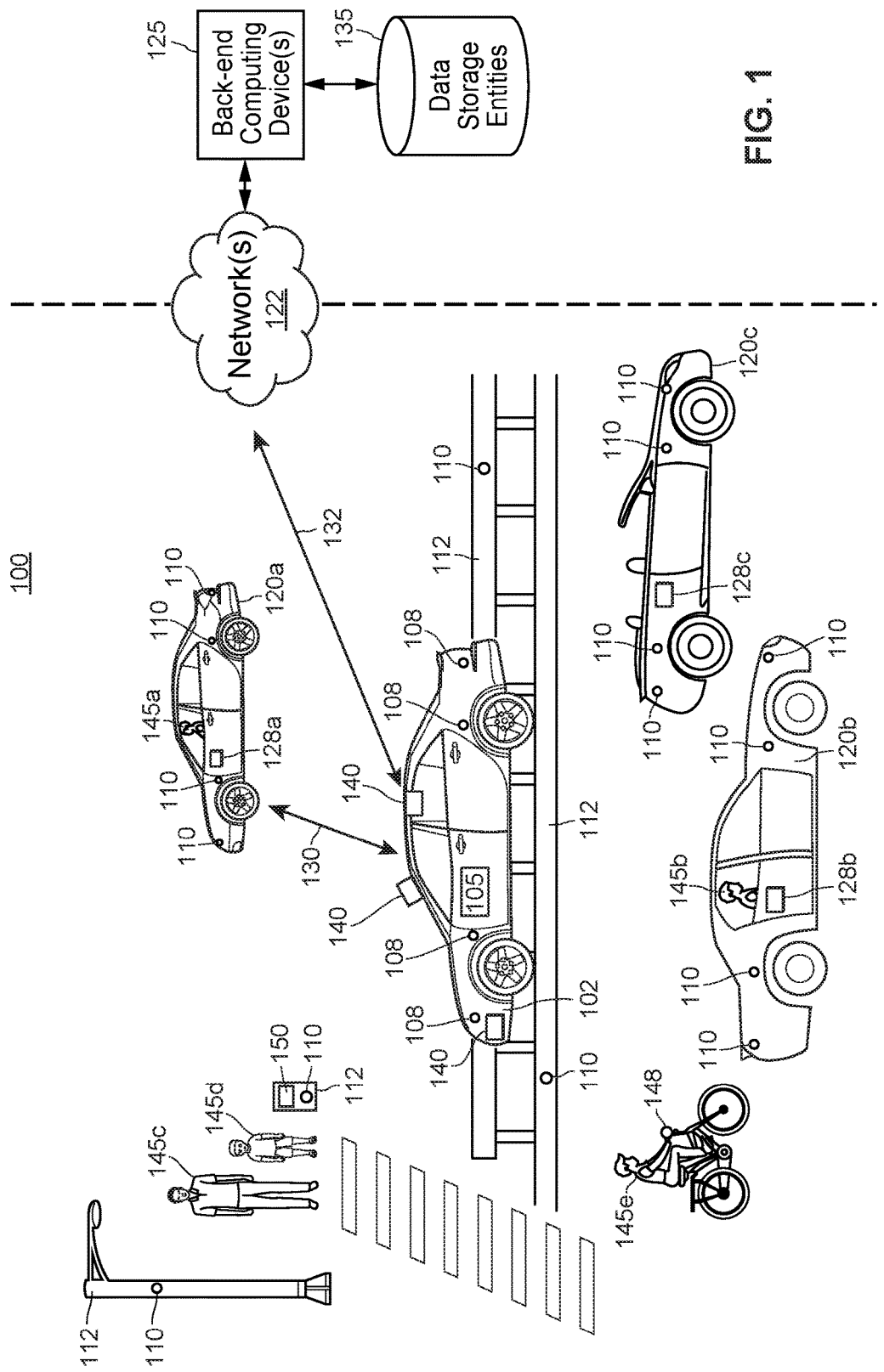
FIG. 1 illustrates a block diagram of an exemplary system for a fully- or semi-autonomous vehicle to signal to and/or communicate with a third-party.

During various driving situations, a human driver who is operating a non-autonomous vehicle may bodily signal to a third-party who is external to the vehicle (e.g., a person who is external to and in the vicinity of the vehicle) to indicate that the human driver is aware of the third-party's presence. As generally used herein, a "third-party" may include any human being who is not being transported by a motor vehicle, and who is in the vicinity of or proximate to the vehicle. As such, a third-party may be a pedestrian, a driver or passenger of another vehicle, a cyclist, a person using a wheelchair or other assistive ambulatory device, a skateboarder or person using another type of wheeled board, a person using roller skates or rollerblades, a person using a scooter, etc.

Such defensive, nonverbal, signaling communication between human drivers of non-autonomous vehicles and third-parties may occur in numerous situations and by using various bodily signals, gestures, or movements. For example, as a non-autonomous vehicle being operated by a human driver approaches a crosswalk that a pedestrian is waiting to use, the pedestrian and the human driver may make eye contact with one another, thereby signaling and assuring the pedestrian that the driver is aware of the pedestrian's presence. Subsequently, the driver may bodily signal to the pedestrian that it is safe for the pedestrian to use the crosswalk, e.g., by a nod of the head or a wave of the hand. If the human driver does not signal as such, or if eye contact is not made between the driver and the pedestrian, the pedestrian may choose to remain on the side of the road and let the driver's vehicle pass. In another example, when a human driver is backing his or her vehicle out of a parking space, the driver and a pedestrian may make eye contact (e.g., through a window and/or a rear-view mirror of the vehicle) to acknowledge that each other's presence has been respectively detected, and subsequently the driver may bodily signal the pedestrian as to whether or not the pedestrian may proceed so that the pedestrian will not be backed into by the driver's vehicle. In yet another example, when multiple human drivers of vehicles approach a four-way stop at a similar moment in time, the drivers may make eye contact and bodily communicate with one another (e.g., head nod, hand wave, pointing, or other gestures) to determine and acknowledge which driver is to proceed into the intersection first, second, third, etc. Thus, as illustrated by these example scenarios, a third-party in the vicinity of a non-attendance vehicle that is being operated by a human driver is easily able ascertain and/or affirm whether or not the human driver of the vehicle has detected the presence of the third-party, and optionally is able to communicate, negotiate, and/or confirm intended actions with the human driver to ensure the safety of both the third-party and of the driver, and to decrease the risk of accident or injury.

With autonomous or self-driving vehicles, though, a third-party in the vicinity of the vehicle does not have a means to ascertain and/or affirm whether or not the autonomous vehicle (AV) is aware of the third-party's presence. As such, a pedestrian who is waiting to cross a road is not able to affirmatively determine and/or be assured that an autonomous vehicle has detected his or her presence, is not able to affirmatively determine whether or not the autonomous vehicle will be slowing down to let the pedestrian cross. Similarly, when multiple drivers approach a four-way stop and one of the vehicles is autonomously operated, the human drivers are not able to communicate bodily (or even easily) with the AV to explicitly determine or negotiate which driver will be entering the intersection in what order, or other intended actions. However, the novel systems, methods, and techniques described and/or claimed herein may be able to provide signaling and communication between an autonomously-operated vehicle and a human third-party, thereby ensuring the safety of the third-party, the autonomous vehicle and any passengers who are being transported therein, and other parties and objects in the vicinity of the vehicle and the third-party, as well as to decrease the risk of an accident or injury, as will be shown below.

FIG. 1 illustrates a block diagram of an exemplary system 100 for an autonomous vehicle (AV) 102 to signal to and/or communicate with a third-party. The high-level architecture illustrated in FIG. 1 may include both hardware and software applications, as well as various data communications channels for communicating data between the various hardware and software components, as is described below.

The autonomous vehicle 102 may be fully- or partially-autonomously operated, and may or may not be transporting passengers or human beings. Typically, the autonomous vehicle 102 may include one or more on-board computers or computing devices 105 disposed thereon which may be communicatively connected to various components of the autonomous vehicle 102. The on-board computer(s) 105 may be installed by the manufacturer of the vehicle 102, or may be installed as an aftermarket modification or addition to the vehicle 102. In FIG. 1, although only one on-board computer 105 is depicted, it should be understood that in some embodiments, a plurality of on-board computers 105 (which may be installed at one or more locations within the vehicle 102) may be used, and at least some of the on-board computers 105 may be in communicative connection. However, for ease of reading and not for limitation purposes, the on-board computing device or computer 105 is referred to herein using the singular tense.

The on-board computer 105 may receive data from and transmit data to various vehicle components, for example, to directly or indirectly control the operation of the vehicle 102 according to various fully- or semi-autonomous operation features. The autonomous operation features may include software applications or modules implemented by the on-board computer 105 to generate and implement control commands to control the steering, braking, or motive power of the vehicle 102. To facilitate such control, the on-board computer 105 may be communicatively connected to control components of the vehicle 102 by various electrical or electromechanical control components (not shown). When a control command is generated by the on-board computer 105, it may thus be communicated to the control components of the vehicle 102 to effect a control action. In embodiments involving fully autonomous vehicles, the vehicle 102 may be operable only through such control components (not shown). In other embodiments, the control components may be disposed within or supplement other vehicle operator control components (not shown), such as steering wheels, accelerator or brake pedals, ignition switches, etc., e.g., to implement semi- or partially-autonomous vehicle operations.

Further, the on-board computer 105 may control one or more operations of the vehicle 102 when the vehicle 102 is operating non-autonomously. For example, the on-board computer 105 may automatically activate various features such as traction control, windshield wipers, headlights, braking, etc. in response to detecting respective triggering conditions.

Generally speaking, the on-board computer 105 may communicate with various vehicle components via any number of wired and/or wireless connections that are on-board the vehicle 102 to directly or indirectly control the operation of the vehicle 102, and to directly or indirectly control the operation of various components of the vehicle 102.

In particular, the on-board computing device 105 may communicatively interface, e.g., via one or more wireless and/or wired connections, with one or more on-board sensors 108 that are disposed on or within the autonomous vehicle 102 and that may be utilized to monitor the vehicle 102 and the environment in which the vehicle is located and operating 102. That is, the one or more on-board sensors 108 may sense or detect conditions associated with the vehicle 102 and/or associated with the external environment in which the vehicle 102 is operating, and may collect or generate data indicative of the sensed conditions to utilize in controlling the operations of the vehicle 102 and its components, and for other purposes. In some configurations, at least some of the on-board sensors 108 may be fixedly disposed at various locations on the vehicle 102. Additionally or alternatively, at least some of the on-board sensors 108 may be incorporated within (e.g., integral with) the on-board computer 105. The one or more of the sensors 108 are generally referred to herein as "on-board sensors 108," and the data that is generated or collected by the sensors 108 is generally referred to herein as "sensor data." The on-board sensors 108 may communicate respective sensor data to the on-board computer 105, and the sensor data may be processed using the on-board computer 105 to determine information regarding the vehicle 102 and conditions occurring in the environment in which the vehicle 102 is operating, determine particular operations that are to be performed by the vehicle 102 and various components thereof, and instruct various vehicle components to behave accordingly.

As discussed above, at least some of the on-board sensors 108 associated with the autonomous vehicle 102 may be removably or fixedly disposed within or at the vehicle 102, and further may be disposed in various arrangements and at various locations to sense and provide information. The sensors 108 that are disposed or installed at the vehicle 102 may include one or more of a GPS unit, a radar unit, a LIDAR unit, an ultrasonic sensor, an infrared sensor, some other type of electromagnetic energy sensor, an inductance sensor, a camera, an accelerometer, an odometer, a system clock, a gyroscope, a compass, a geo-location or geo-positioning unit, a location tracking sensor, a proximity sensor, a tachometer, and/or a speedometer, to name a few. Some of the on-board sensors 108 (e.g., GPS, accelerometer, or tachometer units) may provide sensor data indicative of, for example, the vehicle's location, speed, position, acceleration, direction, responsiveness to controls, movement, etc. Some of the sensors 108 disposed at the vehicle 102 (e.g., radar, LIDAR, camera, or other types of units that operate by using electromagnetic energy) may actively or passively scan the environment external to the vehicle 102 for objects or obstacles (e.g., other vehicles, buildings, pedestrians, trees, gates, barriers, animals, etc.) and their movement, and optionally for weather conditions (e.g., precipitation, wind, visibility, or temperature), roadways, road conditions (e.g., lane markings, potholes, road material, traction, or slope), road topography, traffic conditions (e.g., traffic density, traffic congestion, etc.), signs or signals (e.g., traffic signals, speed limits, other jurisdictional signage, construction signs, building signs or numbers, or control gates), and/or other information indicative of the vehicle's environment.

In some embodiments, some of the on-board sensors 108 may detect and/or communicate with one or more sensors 110 that are disposed externally to the autonomous vehicle 102 in the environment in which the vehicle 102 is operating. Such sensors 110 are generally referred to herein as "off-board sensors 110," and the data that is generated or collected by the off-board sensors 110 is also referred to herein as "sensor data." (Thus, the term "sensor data" may include data that is generated or collected by on-board sensors 108 and/or by off-board sensors 110.) At least some of the off-board sensors 110 may be disposed on various infrastructure components 112 that are fixedly disposed within the environment in which the vehicle 102 is traveling. Infrastructure components 112 may include, for example, roadways, bridges, traffic signals, gates, switches, crossings, parking lots or garages, toll booths, docks, hangars, or other similar physical portions of a transportation system's infrastructure. Other types of infrastructure components 112 at or on which off-board sensors 110 may be disposed may include traffic lights, street signs, railroad crossing signals, construction signs, roadside displays configured to display messages, billboard displays, parking garage monitoring devices, etc. In some embodiments, off-board sensors 110 may be included in one or more environmental networks and/or systems such as a traffic monitoring system, a security system, an autonomous vehicle guidance system, an IoT (Internet-of-Things) system implemented in a city or other jurisdiction, and the like. Additionally or alternatively, at least some of the off-board sensors 110 may be disposed on or at one or more other vehicles 120a-120c operating in the vicinity of the autonomous vehicle 102, e.g., "proximate" vehicles 120a-120c, which may include autonomous vehicles and/or non-autonomous vehicles. As such, a particular sensor that is disposed on-board a proximate vehicle 120a-120c may be viewed as an off-board sensor 110 with respect to the vehicle 102.

Whether disposed on fixed objects such as at infrastructure components 112, or on mobile objects such as at the proximate vehicles 120a-120c, off-board sensors 110 may generate sensor data for delivery to the computer 105 that is on-board the autonomous vehicle 102. Such off-board sensor data may be transmitted directly to the vehicle 102, e.g., via a wireless link that is established directly between a transceiver disposed at the vehicle 102 and a transceiver disposed at the host infrastructure component 112 or at the host proximate vehicle 120. In some scenarios, off-board sensor data may be transmitted indirectly to the vehicle 102 via one or more intermediary entities, such as via a wireless link that is established directly between a transceiver disposed at the vehicle 102 and a transceiver disposed on another object that is in the vicinity of the vehicle 102 and the off-board sensor 110, and to which the off-board sensor 110 is communicatively connected. In some scenarios, off-board sensor data may be transmitted indirectly to the vehicle 102 via one or more networks 122 and/or one or more back-end servers or computing systems 125. For example, off-board sensors 110 disposed on proximate infrastructure components 112 may deliver at least a portion of their respective sensor data to the on-board computer 105 via the network(s) 122 and/or the back-end system 125. Similarly, off-board sensors 110 disposed at proximate vehicles 120a-120c may deliver at least a portion of their respective sensor data via the network(s) 122 and/or the back-end system 125. It is noted that, in some embodiments, the environment in which the autonomous vehicle 102 is operating may exclude off-board sensors 110.

Further, in some scenarios, in addition or alternatively to the sensor data that is collected or generated by the sensors 108, 110, data that is collected or generated by respective computing devices 128a-128c that are on-board the proximate vehicles 120a-120c may be provided to the computing device 105 of the autonomous vehicle 102 for utilizing in integrating and/or analyzing (e.g., in conjunction with the on-board and off-board sensor data) to detect various conditions and to determine appropriate control instructions and/or commands for various components of the vehicle 102. For example, computing device 128a that is on-board vehicle 120a may provide data to the on-board computing device 105 of the vehicle 102 for use in determining subsequent control commands or instructions. The data that is collected and/or generated by the computing device 128a may be transmitted directly between the vehicles 102 and 120a, e.g., via a direct wireless link or connection 130, or the data may be transmitted between the vehicles 102, 120a by utilizing one or more intermediaries, such as via the one or more networks 122 and/or one or more back-end servers or computing systems 125, or via another proximate vehicle 128b. The data that is provided by the computing devices 128a-128c to the on-board vehicle computing device 105 may include sensor data, which may have been collected or generated by sensors associated with the proximate vehicles 120a-120c, and/or which may have been derived, obtained, or inferred by the computing devices 128a-128c of the proximate vehicles 120a-120c.

The one or more networks 122 may include a proprietary network, a secure public internet, a virtual private network, and/or some other type of network, such as dedicated access lines, plain ordinary telephone lines, satellite links, cellular data networks, combinations of these and/or other types of networks. The network(s) 122 may utilize one or more radio frequency communication links to communicatively connect to the vehicle 102, e.g., a wireless communication link 132 that is established between a transceiver of the network(s) 122 and a wireless transceiver disposed at the autonomous vehicle 102. Where the network 122 comprises the Internet or other data packet network, data communications may take place over the network 122 via an Internet or other suitable data packet communication protocol. In some arrangements, the network 122 additionally or alternatively includes one or more wired communication links or networks.

In the system 100, the wireless link 130, the wireless link 132, and/or any other wireless links may utilize one or more suitable wireless communication protocols (e.g., GSM; CDMA; LTE; one or more IEEE 802.11 Standards such as Wi-Fi; WiMAX; BLUETOOTH or another short-range protocol; an ad-hoc cellular communications protocol; a private protocol, etc.). Additionally, the devices that are connected via the wireless links 130, 132 may operate in a peer-to-peer (P2P) manner, client-server manner, or any other suitable manner.

The back-end components 125 may comprise one or more servers or computing devices, which may be implemented as a server bank or cloud computing system, and is interchangeably referred to herein as a "remote computing system 125." The remote computing system 125 may include one or more computer processors adapted and configured to execute various software applications and components of the system 100, in addition to other software applications. The remote computing system 125 may further include or be communicatively connected to one or more data storage devices or entities 135, which may be adapted to store data related to the operation of the vehicle 102, the environment and context in which the vehicle 102 is operating, and/or other information. The one or more data storage devices 135 may be implemented as a data bank or a cloud data storage system, at least a portion of which may be locally accessed by the remote computing system 125 using a local access mechanism such as a function call or database access mechanism, and/or at least a portion of which may be remotely accessed by the remote computing system 125 using a remote access mechanism such as a communication protocol. Generally speaking, the remote computing system 125 may access data stored in the one or more data storage devices 135 when executing various functions and tasks associated with the present disclosure. Further, it is noted that although the system 100 is depicted in FIG. 1 as including the back-end computing devices 125 and the back-end data storage devices 135, in some embodiments, the system 100 may omit or exclude the back-end network 125 and/or the back-end data storage devices 135.

At any rate, the on-board computer 105 of the autonomous vehicle 102 may obtain or receive information or data that is generated by the sensors 108, by the sensors 110, and/or by the computing devices 128a-128c of proximate vehicles 120a-120c. For example, the information or data obtained by the on-board computer 105 from the sensors 108, 110 and/or from the computing devices 128a-128c may be indicative of the respective presence of one or more third-parties 145a-145d that have been detected by the sensors 108, 110, and/or of which the one or more computing devices 128a-128c have been made aware (e.g., by on- and off-board sensors associated with the computing devices 128a-128c). As previously discussed, third-parties may include human beings who are being transported by proximate motor vehicles, and/or may include human beings who are not being transported by any motor vehicle but nonetheless are located in the vicinity of the autonomous vehicle 102. For example, as illustrated in FIG. 1, with respect to the vehicle 102, a third-party human being 145a is operating the proximate, non-autonomous vehicle 120a, and the proximate, autonomous vehicle 120b is transporting a third-party passenger 145b. Also illustrated in FIG. 1 are three persons or third-parties 145c-145e who are in the vicinity of the vehicle 102 and who are not being transported by any motor vehicle.

In some embodiments, in addition to information or data that is indicative of the respective presence of one or more third-parties 145 that have been detected by the sensors 108, 110, and/or 128, information or data indicative of a respective geo-spatial location of each detected third-party 145 may be obtained by the on-board computer 105. At least a portion of such geo-spatial location information or data may be explicitly received at the on-board computer 105 from the sensors 108, the sensors 110, the proximate computing devices 128, and/or another computing device, and/or at least a portion of such geo-spatial location information or data may be inferred or determined by the on-board computer 105 from received or obtained data corresponding to the detected third-parties 145. Information or data indicative of a respective movement or behavior of each detected third-party 145 may be additionally or alternatively obtained by the on-board computer 105 in a similar manner.

The computer 105 that is on-board the autonomous vehicle 102 may analyze the obtained data or information, and may generate, based upon the analysis, one or more instructions for various components of the vehicle 102 and transmit the instructions thereto, to thereby control one or more operations of the vehicle 102 and/or of its components, such as to autonomously operate the vehicle 102. Importantly, based upon the obtained data indicative of the presence, geo-location, movement, and/or other characteristics of the one or more detected third-parties 145, the on-board computer 105 may send one or more instructions to control one or more signaling devices 140 that are on-board the autonomous vehicle 102 to signal, indicated, or communicate with the one or more detected third-parties 145 who are in the vicinity or proximate to the vehicle 102.

The one or more signaling devices 140 (also referred to herein as "SDs 140"), may include one or more devices that are disposed at the vehicle 102 (e.g., that are fixedly connected to the autonomous vehicle 102 or components thereof, and/or that are being transported by the vehicle 102) and that are oriented so that respective signals generated by each signaling device 140 is transmitted into the environment in which the vehicle 102 is operating. That is, each signaling device 140 is physically positioned and oriented so that signals generated by the signaling device 140 are transmitted outside of or externally to the vehicle 102, e.g., so that generated signals may be detected by the third-parties 145.

A signaling device 140 may transmit any type of signal that is detectable or receivable by a human third-party 145. For example, a signaling device 140 may transmit an audio signal via a frequency that is detectable by the human ear. The audio signal may include words or human speech, and/or may include other sounds that do not include speech (e.g., tones, musical notes, beeping, etc.). As such, the signaling device 140 may include a speaker or other type of audio transmitting device.

Additionally or alternatively, a signaling device 140 may transmit a visual signal. For example, the signaling device 140 may transmit or emit a visual signal at a frequency that is detectable by the human eye. The visual signal may include words or text, and/or may include other visual cues that do not include text, such as graphics, colors, dynamic visual movement such as blinking, etc. As such, the signaling device 140 may comprise a light, an array of lights, or other type of light emitting device. For example, the signaling device 140 may comprise a screen or display upon which visual signals may be presented.

In some embodiments, a signaling device 140 may be integrated with or incorporated into components that are on-the autonomous vehicle 102 and that are configured to perform vehicle operations other than signaling the detection of a presence of third-party. That is, a signaling device 140 may be integrated with or incorporated into various vehicle components that control or perform various vehicle operating behaviors. For example, the third-party detection signals may be generated by vehicle headlights, turn signals, and/or other external lights of the vehicle 102, and/or the third-party detection signals may be generated by the horn of the vehicle 102, on-board back-up beeper systems, on-board alarm systems, etc.

In some embodiments, a signaling device 140 may be a stand-alone device that is disposed at the autonomous vehicle 102 but is not included in or integral to another signaling component of the vehicle 102. Such a signaling device 140 may be installed by the manufacturer of the vehicle 102 or as an after-market modification/addition. For example, the signaling device 140 may be an array of LED or other optical, light-emitting elements positioned on or in a body panel, roof, rear-view mirror, grill, bumper, windshield, and/or other window of the vehicle 102. As such, in these embodiments, the signaling device 140 may be a separate device that is fixedly connected or mounted to the vehicle 102 (e.g., within the interior of the vehicle or on the exterior of the vehicle 102) and that includes optical elements that radiate optical energy into the environment external to the vehicle 102 to thereby signal third-parties 145. For instance, a signaling device 140 that is a stand-alone device may include a screen or other set of optical, light-emitting elements.

In some embodiments, a signaling device 140 may transmit an electromagnetic signal, such as a wireless communication signal, which may be detected, received, and processed by another electronic device 148 that is being transported and/or operated by a third-party 145, such as the third-party 145e illustrated in FIG. 1, thereby notifying the third-party 145e that he or she has been detected by the autonomous vehicle 102. For example, a signaling device 140 may transmit a wireless, electronic signal including a payload that indicates the third-party 145e has been detected by the autonomous vehicle 102. The wireless, electronic signal may be transmitted via a transceiver that is on-board the vehicle 102 (which may be integral with the signaling device 140, or may be another, separate device), and to which the on-board computing device 105 is communicatively connected. The payload may be received by a wireless device 148 that is being transported and/or operated by the third-party 145e, such as a mobile phone, smart device, fitness tracker, sensor device, or other type of Personal Electronic Device (PED) that is being transported and/or operated by the third-party 145e. Upon receiving and processing the notification generated by the signaling device 140, the PED 148 utilized by the third-party 145e may provide a notification or signal to the third-party 145e to indicate that the autonomous vehicle 102 has detected his or her presence, and optionally other information. In an implementation, the delivery of the payload indicating that the third-party 145e has been detected by the autonomous vehicle 102 may be implemented via a direct wireless link that is established between the transceiver that is on-board the vehicle 102 and a transceiver of the PED 148 of the third-party 145e. In some implementations, the delivery of the payload indicating that the third-party 145e has been detected by the autonomous vehicle 102 may be transmitted via the transceiver that is on-board the vehicle 102 to the third-party PED 148 via one or more intermediary entities, such as via the network 122 (e.g., via the wireless link 132). As such, in these embodiments, the PED 148 may enable notifications and communications between the autonomous vehicle 102 and the human third-party 145e.

In some embodiments, instead of a third-party 145 utilizing a PED 148 to communicate with the vehicle 102, one or more third-parties 145, such as the third-parties 145c, 145d illustrated in FIG. 1, may utilize a stand-alone computing device 150 that is attached to or included in an infrastructure component 112 that is fixedly disposed in the vehicle environment, e.g., an "infrastructure computing device 150." For example, a computing device 150 may be mounted on a post near a pedestrian crosswalk, and the infrastructure computing device 150 may include one or more user interfaces (e.g., a touch screen, user controls, etc.) that allow pedestrians to receive notifications from autonomous vehicles, and optionally to enter input to communicate with autonomous vehicles. For example, a signaling device 140 of an autonomous vehicle 102 may communicate directly and wirelessly with the infrastructure computing device 150 to thereby notify a pedestrian who is waiting to use the cross walk that his or her presence has been detected. In some configurations, the pedestrian may able to enter user input at the computing device 150 that is transmitted to the vehicle 102 so that desired, intended, or subsequent actions that are to be taken by the vehicle 102 and/or by the pedestrian may be clarified and confirmed between the vehicle 102 and the pedestrian. As such, in these embodiments, the infrastructure computing device 150 may enable notifications and communications between the autonomous vehicle 102 and the human third-parties 145c, 145d.

Generally, a signal that is generated by signaling device 140 and that indicates that the autonomous vehicle 102 has detected the presence of a particular third-party 145 is referred to herein as a "third-party detection notification." As previously discussed, such third-party detection notifications may be auditory (e.g., a voice saying "I see you, person with the red shirt pushing the blue stroller who is waiting to cross the street"), visual (e.g., a scrolling feed displayed on a screen that indicates, in a descriptive manner, that various people in the vicinity of the vehicle 102 have been detected by the vehicle), and/or electromagnetic (e.g., a wireless signal transmitted from the vehicle 102, where the payload of the transmission comprises the third-party detection notification).

In some scenarios, in addition to providing third-party detection notifications, a signaling device 140 of an autonomous vehicle 102 may engage in a two-way dialogue with a third-party 145 to determine and agree on each other's movements. For example, a signaling device 140 may generate and transmit (e.g., by using audio and/or visual signals) a third-party detection notification whose subject is a particular third-party 145, e.g., the third-party 145c, e.g., "Presence of the woman in the blue shirt on right side of road detected. Do you wish to cross? Raise one arm if yes, raise both arms if no." The autonomous vehicle 102 may then obtain and process subsequent sensor data to determine if the woman in the blue shirt has raised one or two arms, and may cause the signaling device 140 to communicate an acknowledgement or other response accordingly, e.g., "I see you wish to cross the road. I am slowing down and stopping to give you right-of-way." Alternatively, if the AV 102 senses that the woman in the blue shirt 145c has not raised either arm, the vehicle 102 may proceed with caution while particularly gathering and analyzing subsequent sensor data corresponding to the movements of the woman in the blue shirt 145c to utilize in guiding its subsequent operations in the vicinity of the woman 145c. Generally speaking, the signaling device 140 may communicate with a human third-party 145c to indicate respective desired or subsequent actions that are be performed by the vehicle 102 or the third-party 145c to thereby decrease the risk of accident or injury. As such, the system 100 may allow a human third-party 145c to respond or communicate nonverbally (e.g., via gestures, movement, etc.) with the autonomous vehicle 102 in a manner similar to that typically utilized by the third-party 145c to communicate with human drivers of non-autonomous vehicles.

In situations in which the signaling device 140 communicates with a PED 148 operated by a third-party 145, e.g., the third-party 145e illustrated in FIG. 1, a dialogue may be transmitted between the on-board computing device 105 of the autonomous vehicle 102 and the PED 148 by using the signaling device 140 and wireless electronic signals, e.g., in a manner such as previously discussed. In these scenarios, upon being notified, via the PED 148, that the vehicle 102 has detected the presence of the third-party 145e (e.g., "Blue Honda Civic AV approaching from the south has detected your presence"), the third-party 145e operating the PED 148 may type, enter, speak, or otherwise provide input via one or more user interfaces of the PED 148 to communicate with the autonomous vehicle 102, e.g., to indicate his or her intended subsequent movements or behavior to the vehicle 102.

In some situations in which a third-party 145e is operating a PED 148, the PED 148 may automatically and continuously broadcast a beacon signal, announcement signal, or another type of signal that continually or periodically indicates the presence of the third-party 145e over time. An autonomous vehicle 102 may continuously scan (e.g., via a wireless transceiver, the signaling device 140, and/or the on-board computer 105) for such beacons, announcements, or third-party presence signals. Upon detection of such a signal, the signaling device 140 may engage in communicating with the third-party's PED 148 to signal that the third-party 145e has been detected, and optionally may communicate with the PED 148, for example, to negotiate and agree upon desired and/or subsequent behaviors or actions of the vehicle 102 and the third-party 145e to decrease the risk of accident or injury.

As discussed above, the computing device 105 on-board the autonomous vehicle 102 may wirelessly communicate with an on-board computing device 128 of a proximate vehicle 120. For example, referring to FIG. 1, the computing device 105 may transmit, via a wireless transceiver, a respective third-party detection notification to a computing device 128a of a proximate vehicle 120a, and may transmit a respective third-party detection notification to a computing device 128*b* of a proximate vehicle 120*b*. In some scenarios, in addition to the transmissions of the third-party detection notifications, respective dialogues between the autonomous vehicle's computing device 105 and the proximate vehicles' computing devices 128*a*, 128*b* may be established by using wireless electronic signals, e.g., in manners such as previously discussed. Respective dialogues between the on-board computing device 105 of the autonomous vehicle 102 and the on-board computing devices 128*a*, 128*b* of the proximate vehicles 120*a*, 120*b* may occur to thereby negotiate and agree upon desired and/or subsequent behaviors or actions of the vehicle 102 and of the proximate vehicle 120*b*. A dialogue may include input from a driver or passenger of the proximate vehicle (e.g., the driver 145*a* of the vehicle 120*a*, or the passenger 145*b* of the vehicle 120*b*), or a dialogue may occur between the computing devices 105, 128*a*, 128*b* without any human input.

It is noted that some autonomous vehicles 102 may include more than one signaling device 140, which may be of the same type or may be of different types. The multiple signaling devices 140 may be disposed at or on the vehicle 102 and may be collectively oriented so as to be able to signal and/or communicate with any third-party 145 who is within the vicinity of the vehicle 102 (e.g., who is detectable by the on-board sensors 108, the off-board sensors 112, and/or other computing devices 128 that are on-board proximate vehicles 120), irrespective of the geo-location of the third-party 145 with respect to the vehicle 102. That is, the multiple signaling devices 140 may be positioned so that any person within the vicinity of the vehicle 102 is able to be signaled by the vehicle 102 by at least one signaling device 140.

Additionally, it is noted that although the system 100 is shown in FIG. 1 to include one vehicle 102 in proximity to three other vehicles 120*a*-120*c*, one computer 105, 128*a*-128*c* on-board each vehicle 102, 120*a*-120*c*, one remote computing system 125, and one remote data storage device or entity 135, it should be understood that different numbers of vehicles 102, 120, on-board computers 105, 128, remote computing devices or servers 125, and/or remote data storage devices 135 may be utilized. For example, the system 100 may include a plurality of servers 125 and hundreds or thousands of on-board computers 105, all of which may be interconnected via the network 122. Furthermore, the database storage or processing performed by the one or more servers 125 may be distributed among a plurality of servers 125 in an arrangement known as "cloud computing." This configuration may provide various advantages, such as enabling near real-time uploads and downloads of information as well as periodic uploads and downloads of information. This may in turn support a thin-client embodiment of the on-board computer 105 discussed herein.

Figure 2:
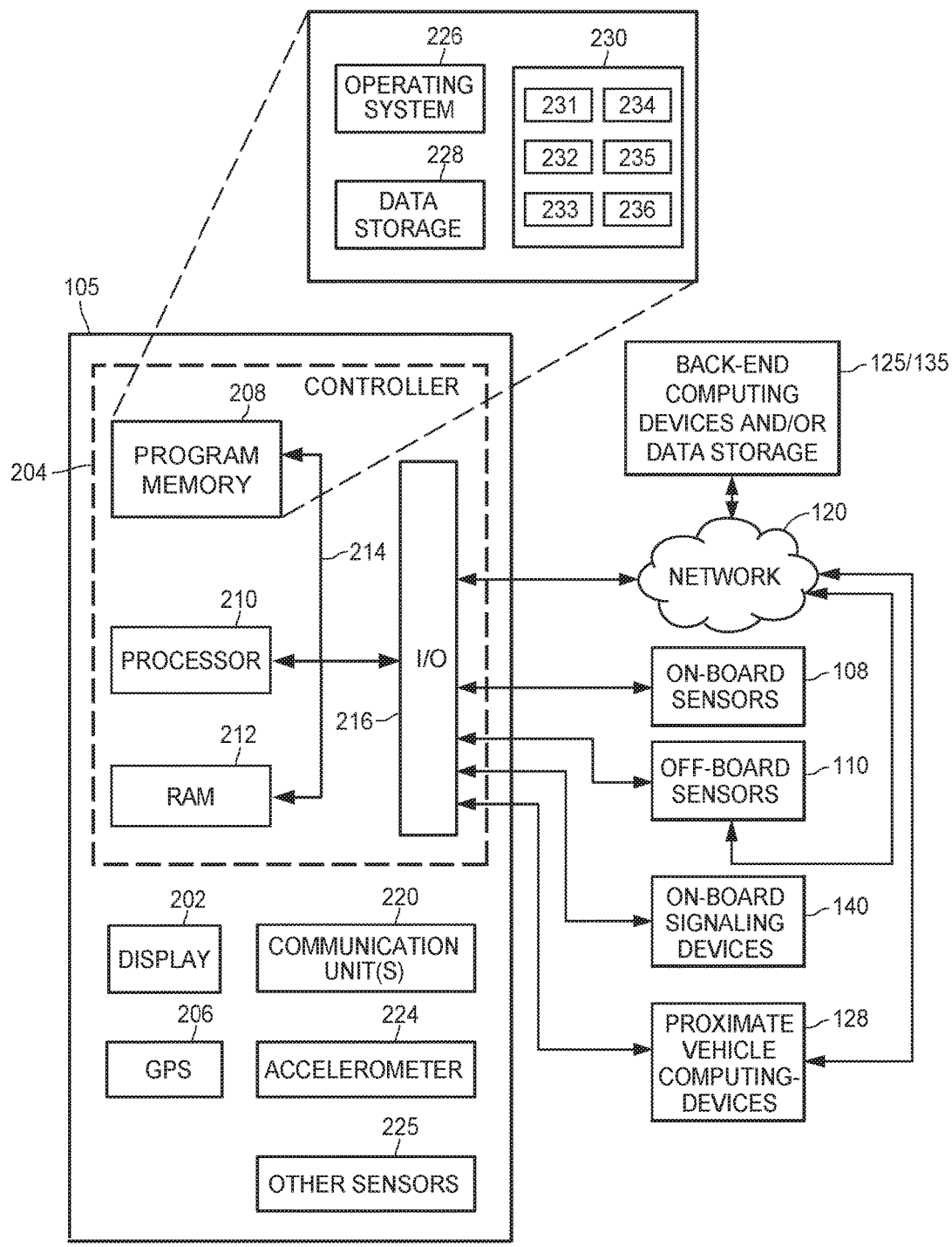
FIG. 2 illustrates a block diagram of the exemplary on-board computer of FIG. 1.

FIG. 2 illustrates a block diagram of an exemplary on-board computer 105 consistent with the system 100 of FIG. 1. For example, the on-board computer 105 may be included or disposed at an autonomous vehicle 102. The on-board computer 105 may include a display 202, a controller 204, a GPS or other suitable geo-location unit 206, a communication unit 220, an accelerometer 224, one or more additional sensors 225, and/or a user-input device (not shown). The on-board computer 105 may interface with one or more on-board sensors 108 that are disposed at the vehicle 102 (but that are separate from the device 105) to obtain or receive information or data generated by the sensors 108 that is indicative and/or descriptive of the environment in which the vehicle 102 is operating and objects therein. Additionally, the on-board computer 105 may interface with one or more signaling devices 140 disposed at the autonomous vehicle 102, e.g., to control transmissions and other behavior of the one or more signaling devices 140. In some embodiments, the on-board computer 105 may interface (e.g., either directly and/or via the network 122) with one or more off-board sensors 110 to obtain or receive information or data generated by the sensors 110 that is indicative and/or descriptive of the environment in which the vehicle 102 is operating and objects therein. Similarly, the on-board computer 105 may communicate with one or more computing devices 128 that are on-board proximate vehicles 120, e.g., by using one or more wireless transceivers included in the communication unit 220, to obtain or receive information or data that is indicative and/or descriptive of the vehicle's environment and objects therein.

The controller 204 may include a program memory 208, one or more microcontrollers or microprocessors (MP) 210, a RAM 212, and an I/O circuit 216, all of which are interconnected via an address/data bus 214. The program memory 208 may include an operating system 226, a data storage 228, and/or a plurality of software applications 230. The operating system 226, for example, may include one of a plurality of general purpose or mobile platforms, such as the Android™, iOS®, or Windows® systems, developed by Google Inc., Apple Inc., and Microsoft Corporation, respectively. Alternatively, the operating system 226 may be a custom operating system designed for the on-board computer 105. The data storage 228 may include data such as profiles and preferences, application data for the plurality of applications 230, and other data related to the signaling of and communication with third-parties. In some embodiments, the controller 204 may also include, or otherwise be communicatively connected to, other data storage mechanisms (e.g., one or more hard disk drives, optical storage drives, solid state storage devices, etc.) that reside within the vehicle 102 and/or at the remote system (e.g., the remote data storage 135).

It should be appreciated that although FIG. 2 depicts only one microprocessor 210, the controller 204 may include multiple microprocessors 210. Similarly, the memory of the controller 204 may include multiple RAMs 212 and multiple program memories 208. Although FIG. 2 depicts the I/O circuit 216 as a single block, the I/O circuit 216 may include a number of different types of I/O circuits. The controller 204 may implement the RAMs 212 and the program memories 208 as semiconductor memories, magnetically readable memories, biologically readable memories, or optically readable memories, for example. Generally speaking, the RAMs 212 and/or the program memories 208 may respectively comprise one or more non-transitory, tangible, computer-readable storage media or other suitable physical devices.

The one or more processors 210 of the device 105 may be adapted and configured to execute any of one or more of the plurality of software applications 230 residing in the program memory 204, in addition to other software applications. The various software applications 230 of the device 105 may include, for example, a monitoring application 231 for obtaining or receiving (whether from on-board sensors 108, off-board sensors 110, and/or other computing devices 128 on-board proximate vehicles 120) sensor data indicative of the external environment in which the autonomous vehicle 102 is operating and any objects therein; a third-party detection application 232 for detecting respective presences of respective third-parties 145 within the environment of the vehicle 102 (and optionally their respective characteristics, gestures, and/or movements); a signaling device control application 233 for communicating information and/or instructions to one or more signaling devices 140 of the vehicle 102, including instructions to transmit third-party detection notifications and optionally other information directed at the detected third-parties 145; and a vehicle operations control application 234 for determining and providing control instructions to various components of the autonomous vehicle 102 to control operational behavior of the vehicle 102 based upon the detected third-parties 145 and, in some cases, based upon subsequent dialogue held between the vehicle 102 and the third-parties 145. Other applications that are executed at the device 105 may include, for example, an application for supporting autonomous and/or semi-autonomous vehicle operations 235 (e.g., with which the application 234 may be at least partially integral), and/or one or more other applications 236 which may support other vehicle operations, context determination, and/or other features of the autonomous vehicle 102. Generally speaking, the applications 230 may perform one or more functions related to detecting the presence of third-parties 145 within the environment in which the autonomous vehicle 102 is operating; generating and transmitting third-party detection notifications signals; supporting a two-way dialogue between third-parties 145 and the autonomous vehicle 102 to increase the safety of the environment and avoid accident or injury; and/or other actions related to detecting and communicating with third-parties 145. For example, one or more of the applications 230 may perform at least a portion of any of the methods described herein. In some embodiments, one or more of the applications 230 may operate in conjunction with the remote computing system 125 to perform one or more functions related to detecting and communicating with third-parties 145. For example, one or more of the applications 231-236 at the device 105 may be implemented as a thin-client that operates in conjunction with one or more of the applications at the remote computing system 125.

The various software applications 230 may be executed on the same computer processor 210 or on different computer processors. Further, while the various applications 231-236 are depicted as separate applications, two or more of the applications 231-236 may be integrated as an integral application, if desired. In some embodiments, at least one of the applications 231-236 may be implemented in conjunction with another application (not shown) that is stored and executed at the device 105, e.g., a navigation application, a user interface application, etc.

Further, in some configurations, the on-board computer 105 may include a user-input device (not shown) for receiving instructions or information from a passenger or other human being who is being transported by the autonomous vehicle 102, such as settings, selections, acknowledgements, etc. The user-input device (not shown) may include a "soft" keyboard that is displayed on the display 202, an external hardware keyboard communicating via a wired or a wireless connection (e.g., a Bluetooth keyboard), an external mouse, a microphone, or any other suitable user-input device. The user-input device (not shown) may also include a microphone capable of receiving user voice input.

Figure 3:
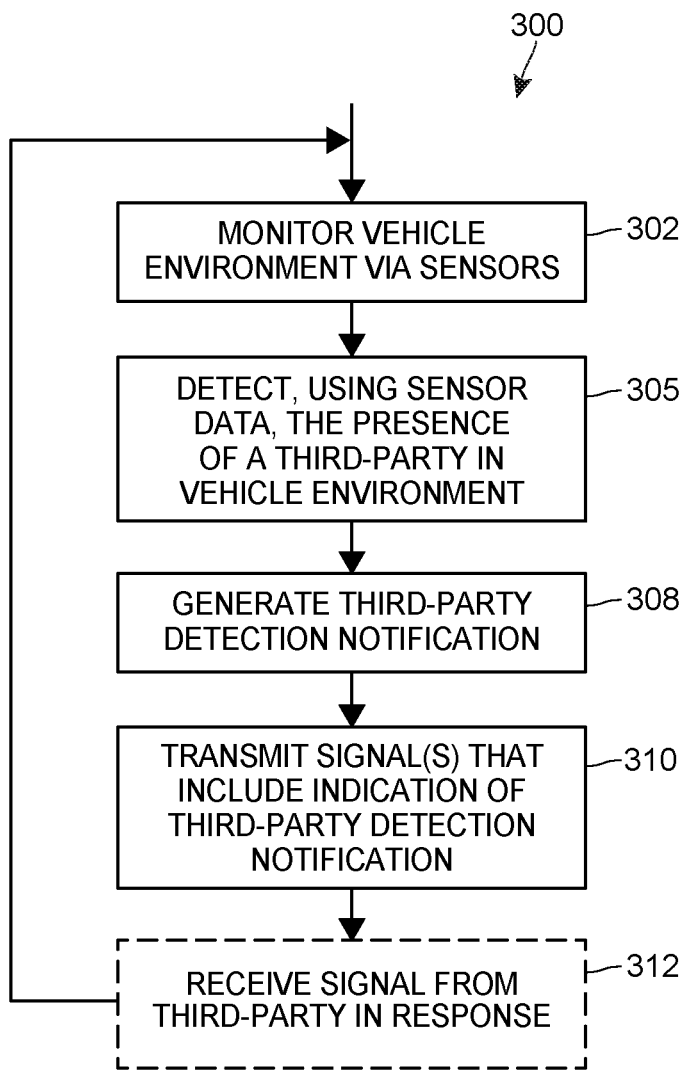
FIG. 3 depicts a flow chart of an example method for signaling or indicating, to a third-party who is external to a vehicle, that the third-party has been detected by the vehicle.

FIG. 3 depicts a flow diagram of an exemplary method 300 for signaling or indicating, to a third-party who is external to a vehicle, that the third-party has been detected by the vehicle. The method 300 may be performed by a fully- or partially-autonomous vehicle, such as the vehicle 102 of FIG. 1. At least a portion of the method 300 may be performed by the system 100 of FIG. 1, for example, by the on-board computer 105 and/or other components of the system 100. For ease of discussion, and not for limitation purposes, the method 300 is discussed with simultaneous reference to the system 100, the vehicle 102, the on-board computing device 105, and FIGS. 1 and 2, although it is understood that the method 300 may operate in conjunction with other systems, vehicles, and/or computing devices.

At a block 302, the method 300 may include monitoring an environment in which a subject vehicle 102 is located and/or operating, e.g., a vehicle environment. The subject vehicle 102 may be fully- or semi-autonomously operated, for example. Monitoring the vehicle environment may include, for example, obtaining or receiving data generated or collected by sensors associated with the subject vehicle 102. The sensors may include, for example, on-board sensors 108, off-board sensors 110, and/or computing devices 128 that are disposed on-board other vehicles 120 that are proximate to or within the vicinity of the subject vehicle 102. In some embodiments, monitoring the vehicle environment may include detecting, obtaining, or receiving one or more wireless signals that are generated by a personal electronic device (PED) 148 associated with a third-party 145e who is located within the vehicle's environment, e.g., beacon or announcement signals generated by the PED 148. Such signals generated by PEDs 148 are also be referred to herein as "sensor data," as such signals are sensed at the subject vehicle 102 and are indicative of objects disposed within the vehicle's environment. At any rate, the obtained sensor data may include data that is indicative and/or descriptive of conditions of and/or objects disposed in the vehicle environment, and optionally, of the dynamic behavior over time of the conditions and objects.

At a block 305, the method 300 may include detecting, based upon the obtained sensor data, that a third-party 145 is located within the vehicle environment, where the third-party 145 is a human being or person. For example, one or more analyses may be performed on the obtained sensor data to detect the presence of the third-party 145, and optionally the presence of any objects associated with and/or being operated by the third-party 145, such as bicycles, skateboards, wheelchairs, strollers, motor vehicles, etc. In an embodiment, detecting the presence of the third-party 145 may include detecting or obtaining other information that is indicative or descriptive of the third-party 145, such as the third-party's geo-location with respect to the location of the subject vehicle 102, one or more physical characteristics of the third-party 145, gestures and/or movements made by the third-party 145, etc.

At a block 308, the method 300 may include generating a notification indicating that the presence of the third-party 145 (and optionally, other information) has been detected at or by the subject vehicle 102. That is, the notification may indicate that the subject vehicle 102 is aware of the presence of the third-party 145. The notification may include other information that is indicative and/or descriptive of the detected third-party 145 and optionally a respective geo-location of the detected third-party 145, e.g., with respect to the current geo-location of vehicle 102.

At a block 310, the method 300 may include transmitting one or more signals that include an indication of the third-party detection notification into the environment surrounding the subject vehicle 102. The one or more signals may include, for example, an audio signal, a visual signal, and/or an electromagnetic signal, such as those described above, and may be directed at the detected third-party 145. Generating the notification may include instructing one or more signaling devices 140 to generate and transmit respective signals into the vehicle's environment. In an embodiment, transmitting the one or more signals that include the indication of the third-party detection notification thereby alerts and/or confirms to the third-party 145 that his or her presence has been explicitly detected by the vehicle 102.

In some embodiments, the method 300 includes optionally receiving a signal from the detected third-party 145 in response to the transmitted signal of block 310 (block 312). Generally, the response signal sent by the detected third-party 145 may be detected or sensed by the on-board sensors 108, the off-board sensors 110, and/or the on-board computing device 105 of the subject vehicle 102. In some situations, the response signal sent by the detected third-party 145 may be detected or sensed by one or more of the on-board computing devices 128 of proximate vehicles 120, and forwarded to the on-board computing device 105 of the subject vehicle 102. The response signal may be indicative of a responsive physical movement, gesture, or behavior of the third-party 145, and/or the response signal may include an electronic signal that is generated by a personal electronic device 148 that is being transported by the third-party 145, or that is generated by another computing device 150 disposed in the vicinity of the third-party 145. For example, the third-party 145 may provide input into a computing device 150 disposed on an infrastructure component 112 by a crosswalk to thereby communicate with the vehicle.

In some embodiments, the blocks 310 and 312 are repeated one or more times, thereby establishing a two-way dialogue or communication between the subject vehicle 102 and the detected third-party 145. The content of such a dialogue may clarify and confirm intended, desired, and subsequent actions or behaviors of the subject vehicle 102 and of the detected-third-party 145, thereby decreasing the risk of an accident or injury and increasing safety for all parties.

Generally, the method 300 may return to the block 302 to continue the monitoring of the vehicle's environment, which may change as the subject vehicle 102 travels along its route.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Moreover, the systems and methods described herein are directed to an improvement to computer functionality and improve the functioning of conventional computers.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed is:

1. A system for signaling, to a third-party external to a vehicle, that the third-party has been detected by the vehicle, the system comprising:
   one or more sensors associated with the vehicle;
   one or more processors associated with the vehicle and communicatively connected to the one or more sensors;
   one or more signaling devices associated with the vehicle and communicatively connected to the one or more processors;

one or more tangible, non-transitory memories storing thereon computer-executable instructions that, when executed by the one or more processors, cause the system to:
- monitor, via the one or more sensors, an environment in which the vehicle is located, the environment in which the vehicle is located being a vehicle environment;
- detect that a third-party is located within the vehicle environment based upon sensor data obtained from the one or more sensors while monitoring the vehicle environment, the third-party being a person; and
- engage in a dialogue with the third-party, including:
  - generate a notification indicating that a presence of the third-party has been detected by the vehicle, the notification being a third-party detection notification;
  - transmit, into the vehicle environment via the one or more signaling devices associated with the vehicle, one or more indications of the third-party detection notification, thereby alerting the third-party that the presence of the third-party has been detected by the vehicle;
  - detect via the one or more sensors associated with the vehicle, a bodily signal made by the third-party in response to the third-party detection notification; and
  - based upon the detected bodily signal of the third party, at least one of: communicate an acknowledgement to the third-party via the one or more signaling devices, communicate a response to the third-party via the one or more signaling devices, or modify an operation of the vehicle.

2. The system of claim 1, wherein:
- the one or more signaling devices include a wireless communication transceiver that is associated with the vehicle and that is included in the one or more sensors associated with the vehicle;
- the sensor data obtained via the wireless communication transceiver is based upon a wireless signal generated by one or more mobile computing devices associated with the third-party and received via the wireless communication transceiver; and
- the transmission of the one or more indications of the third-party detection notification into the vehicle environment via the one or more signaling devices associated with the vehicle includes a transmission, into the vehicle environment, of a respective indication of the third-party detection via the wireless communication transceiver to the one or more mobile computing devices associated with the third-party.

3. The system of claim 1, wherein the engagement in the dialogue with the third-party further includes a communication that is transmitted into the vehicle environment via the one or more signaling devices and that indicates at least one of an action to be performed by the vehicle or an action to be performed by the third-party based upon the third-party detection notification.

4. The system of claim 1, wherein at least one of:
(i) the one or more signaling devices include an audio signaling device associated with the vehicle, and the one or more indications of the third-party detection notification comprises an audio signal transmitted via the audio signaling device into the environment in which the vehicle is located; or
(ii) the one or more signaling devices include a visual signaling device associated with the vehicle and facing the environment in which the vehicle is located, the one or more indications of the third-party detection notification comprises a visual signal generated by the visual signaling device and emitted into the environment in which the vehicle is located, the visual signal including a display of at least one of alphanumeric characters or a graphic, and the visual signal generated by the visual signaling device is excluded from a set of visual signals that are generated by other devices disposed at the vehicle and that are indicative of one or more operating behaviors of the vehicle.

5. The system of claim 1, wherein the third-party includes at least one of: a pedestrian, a cyclist, a person using a wheelchair or other assistive ambulatory device, a person using a wheeled board, a person using roller skates or roller blades, a person using a scooter, or a person who is being transported by another vehicle.

6. A computer-implemented method of signaling, to a third-party external to a vehicle, that the third-party has been detected by the vehicle, comprising:
- monitoring, using one or more sensors associated with the vehicle, an environment in which the vehicle is located, the environment in which the vehicle is located being a vehicle environment;
- detecting, based upon sensor data obtained from the one or more sensors while monitoring the vehicle environment and by using one or more processors associated with the vehicle and communicatively connected to the one or more sensors, that a third-party is located within the vehicle environment, the third-party being a person; and
- engaging in a dialogue with the third-party, including:
  - generating, by one or more processors, a notification indicating that a presence of the third-party has been detected by the vehicle, the notification being a third-party detection notification;
  - transmitting, into the vehicle environment via one or more signaling devices associated with the vehicle, one or more indications of the third-party detection notification, thereby alerting the third-party that the presence of the third-party has been detected by the vehicle;
  - detecting, via the one or more sensors associated with the vehicle, a bodily signal made by the third-party in response to the third-party detection notification; and
  - based upon the detected bodily signal of the third-party, at least one of: communicating an acknowledgment to the third-party, communicating a response to the third-party, or modifying an operation of the vehicle.

7. The computer-implemented method of claim 6, wherein detecting that the third-party is located within the vehicle environment based upon the sensor data comprises detecting that the third-party is located within the vehicle environment based upon a wireless signal generated by one or more mobile computing devices associated with the third-party and detected by the one or more sensors.

8. The computer-implemented method of claim 6, wherein transmitting the indication of the third-party detection notification via the one or more signaling devices associated with the vehicle comprises transmitting the indication of the third-party detection notification via a wireless communication transceiver associated with the vehicle to the one or more mobile computing devices associated with the third-party.

9. The computer-implemented method of claim 6, further comprising communicating additional information via the one or more signaling devices to the third-party, the additional information indicative of at least one of a desired action to be performed by the vehicle or a desired action to be performed by the third-party, and the additional information based upon the third-party detection notification.

10. The computer-implemented method of claim 6, wherein transmitting the one or more indications of the third-party detection notification into the environment in which the vehicle is located via the one or more signaling devices associated with the vehicle includes transmitting an audio signal generated by an audio signaling device disposed at the vehicle into the environment in which the vehicle is located.

11. The computer-implemented method of claim 6, wherein transmitting the one or more indications of the third-party detection notification into the environment in which the vehicle is located via the one or more signaling devices associated with the vehicle includes generating a visual signal at a visual signaling device disposed at the vehicle and facing into the environment in which the vehicle is located, the visual signal including a display of at least one of alphanumeric characters or a graphic, and emitting the visual signal into the environment in which the vehicle is located.

12. The computer-implemented method of claim 6, wherein detecting that the third-party is located within the vehicle environment comprises detecting that one of: a pedestrian, a cyclist, a person using a wheelchair or other assistive ambulatory device, a person using a wheeled board, a person using roller skates or roller blades, a person using a scooter, or a person who is being transported by another vehicle is located within the vehicle environment.

13. A tangible, non-transitory computer-readable medium storing instructions for acknowledging third-party detection that, when executed by one or more processors of a computer system, cause the computer system to:
monitor, via one or more sensors associated with the vehicle, an environment in which the vehicle is located, the environment in which the vehicle is located being a vehicle environment;
detect that a third-party is located within the vehicle environment based upon sensor data obtained from the one or more sensors while monitoring the vehicle environment in which the vehicle is located, the third-party being a person; and
engage in a dialogue with the third-party including executing at least a portion of the stored instructions to cause the computer system to:
generate a notification indicating that a presence of the third-party has been detected by the vehicle, the notification being a third-party detection notification;
transmit, into the vehicle environment via one or more signaling devices associated with the vehicle, one or more indications of the third-party detection notification, thereby alerting the third-party that the presence of the third-party has been detected by the vehicle;
detect, via the one or more sensors associated with the vehicle, a bodily signal made by the third-party in response to the third-party detection notification; and
based upon the detected bodily signal of the third-party, at least one of: communicate an acknowledgment to the third-party, communicate a response to the third-party, or modify an operation of the vehicle.

14. The tangible, non-transitory computer-readable medium of claim 13, wherein at least one of:
(i) the sensor data includes data included in a wireless signal generated by a personal electronic device associated with third-party and received at a wireless communication transceiver disposed at the vehicle; or
(ii) the wireless communication transceiver is included in the one or more sensors.

15. The tangible, non-transitory computer-readable medium of claim 13, wherein at least one of:
the one or more signaling devices include an audio signaling device disposed at the vehicle, and the one or more indications of the third-party detection notification includes an audio signal transmitted by the audio signaling device into the vehicle environment in which the vehicle is located; or
the one or more signaling devices include a visual signaling device disposed at the vehicle and facing into the vehicle environment in which the vehicle is located, the one or more indications of the third-party detection notification includes a visual signal generated by the visual signaling device and emitted into the environment in which the vehicle is located, the visual signal including a display of at least one of alphanumeric characters or a graphic, and the visual signal generated by the visual signaling device is excluded from a set of visual signals that are generated by other devices disposed at the vehicle and that are indicative of one or more operating behaviors of the vehicle.

16. The tangible, non-transitory computer-readable medium of claim 13, wherein the third-party includes at least one of: a pedestrian, a cyclist, a person using a wheelchair or other assistive ambulatory device, a person using a wheeled board, a person using roller skates or roller blades, a person using a scooter, or a person who is being transported by another vehicle.

17. The system of claim 1, wherein the vehicle is at least partially-autonomously operated.

18. The system of claim 6, the vehicle is at least partially-autonomously operated.

19. The system of claim 2, wherein the engagement in the dialogue with the third-party further includes a reception, via the wireless communication transceiver, of a wireless signal generated by the one or more mobile computing devices associated with the third-party in response to the third-party detection notification in addition to the detection of the bodily signal made by the third-party.

20. The system of claim 13, wherein the bodily signal made by the third-party includes at least one of: a head movement of the third-party, an eye movement of the third-party, or a hand signal of the third-party.

* * * * *